GEORGE W. MERRICK.
Coffee-Roaster.

No. 127,086.  Patented May 21, 1872.

Witnesses
E. H. Bates
H. B. Curtis

Inventor
G. W. Merrick,
Chipman Hosmer & Co
Attys,

UNITED STATES PATENT OFFICE.

GEORGE W. MERRICK, OF ADRIAN, MICHIGAN.

IMPROVEMENT IN COFFEE-ROASTERS.

Specification forming part of Letters Patent No. 127,086, dated May 21, 1872.

*To all whom it may concern:*

Be it known that I, GEORGE W. MERRICK, of Adrian, in the county of Lenawee and State of Michigan, have invented a new and valuable Improvement in Coffee-Roasters; and I do hereby declare that the following is a full, clear, and exact description of the construction and operation of the same, reference being had to the annexed drawing making a part of this specification, and to the letters and figures of reference marked thereon.

Figure 1:
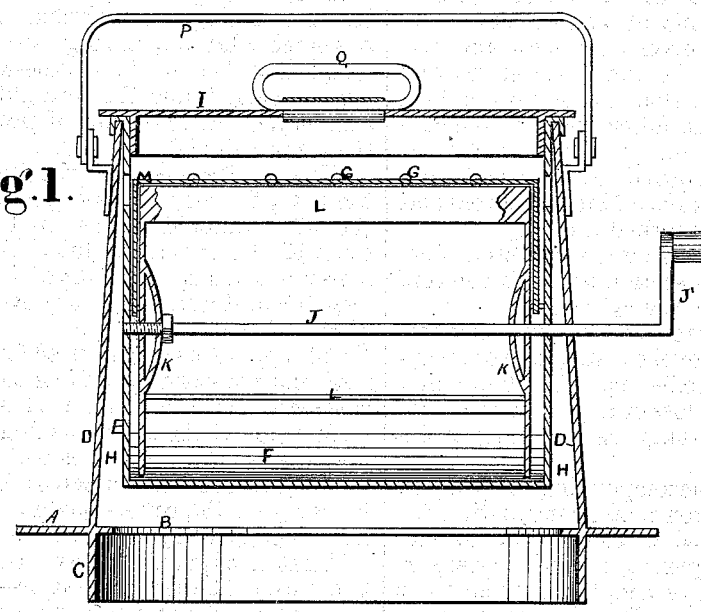
Figure 2:
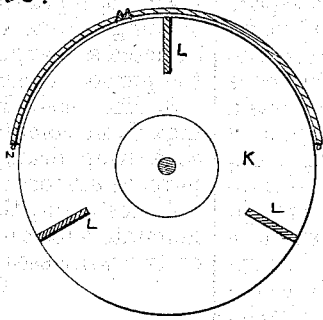

Figure 1 of the drawing is a representation of a vertical central section of my invention. Fig. 2 is a section of the cylinder.

This invention has relation to coffee-roasters; and consists in the novel construction of an apparatus in which coffee may be thoroughly roasted without the loss of any of its aromatic properties, substantially as hereinafter described.

Referring to the accompanying drawing, A represents a sheet-iron plate, constituting the base of my improved coffee-roaster. B represents a circular opening in said plate, surrounded by a flange or rim, C, of a size to fit the lid-hole of a stove. D designates a sheet-metal case, having four inclined sides, and resting on the plate A. E designates a sheet-metal basin, having four vertical sides, secured to the upper part of the case D, a concave bottom, F, and a series of draught-apertures, G. The latter are cut near the top of the basin and communicate with the flue or heat-space H, between the walls of the case A and basin E. The coffee to be roasted is placed in the basin, and the heat, drawn up through the space H by means of the apertures G, heats said basin on all sides, so as to roast the coffee quickly and thoroughly. I designates a flanged lid, fitting the top of the case and basin. J indicates a shaft, running longitudinally through the case and basin. Within the basin it is furnished with a pair of circular heads, K, supporting radial paddle L. The heads K are concentric with the concave bottom of the basin. The shaft J is rotary, and is operated by means of a crank, J'. The paddle-wheel formed by the heads K and the paddles L is used for the purpose of agitating the coffee during the roasting process. The wheel is secured to the shaft by cutting a thread or threads on the latter and placing nuts thereon. M designates a semicircular lid, having two ends, N, and adapted to fit over the paddle-wheel or agitator, between it and the draught-apertures G, and supported by means of projections O, or their equivalents.

When coffee placed in the basin first feels the heat, the moisture escapes therefrom, and should be allowed to pass off by leaving the cover M off for a short while. As soon as this moisture is expelled the cover M should be put over the agitator, so as to prevent the escape of the aroma.

This apparatus may be used for roasting peanuts and pop-corn as well as coffee. In such cases the lid I may be used so as to throw back the heat from the openings G, there being no aromatic properties which it is desirable to preserve. P indicates a bail, to be used in carrying the coffee-roaster. Q designates a handle, by which to hold the lid I.

What I claim as my invention, and desire to secure by Letters Patent, is—

1. In a coffee or pea-nut roaster, the outer case D and inner case or basin E, separated by the flue-space H, in combination with the rotary agitator having the shaft J and paddles L, arranged to operate substantially as specified.

2. In a coffee-roaster having the case D, basin E, separating-flue space H, and flue-openings G, as described, the cover M, constructed and arranged substantially as and for the purpose specified.

3. The basin E, having the draught-openings G, in combination with the case D and separating-draught space H, as and for the purpose set forth.

In testimony that I claim the above I have hereunto subscribed my name in the presence of two witnesses.

GEORGE W. MERRICK.

Witnesses:
F. A. ROBERTSON,
R. B. ROBBINS,
WILLARD STEARNS.